Sept. 12, 1939.  A. R. LINTERN ET AL  2,172,939
VEHICLE VENTILATION APPARATUS
Filed Jan. 2, 1937
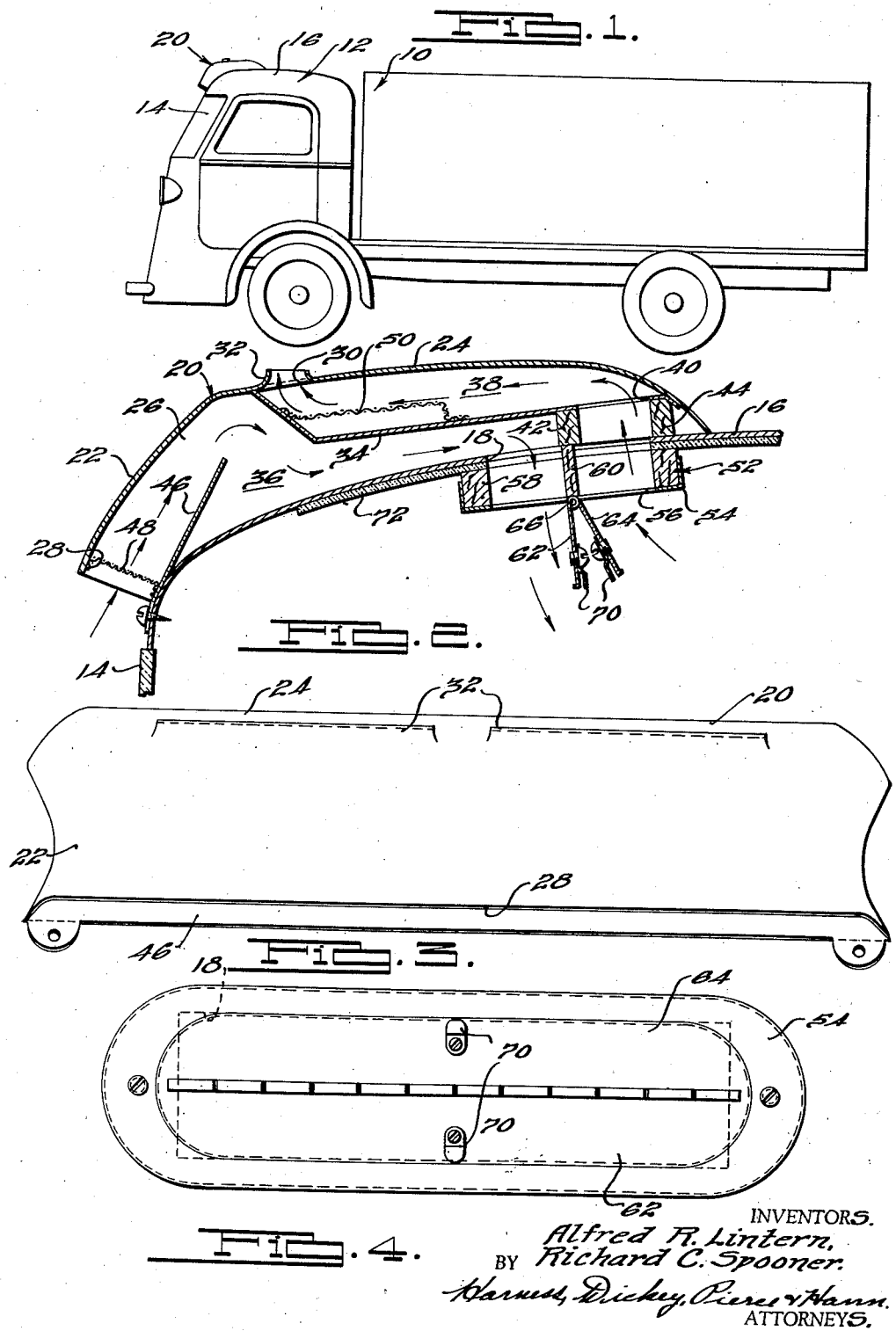
INVENTORS.
Alfred R. Lintern,
BY Richard C. Spooner.
Harness, Dickey, Pierce & Hann
ATTORNEYS.

Patented Sept. 12, 1939

2,172,939

UNITED STATES PATENT OFFICE 2,172,939

VEHICLE VENTILATION APPARATUS

Alfred R. Lintern and Richard C. Spooner, Detroit, Mich., assignors to Evans Products Company, Detroit, Mich., a corporation of Delaware Application January 2, 1937, Serial No. 118,725

7 Claims. (Cl. 98—2)

This invention relates to vehicle ventilating structures and particularly relates to vehicle ventilating structure for use with closed vehicle bodies such as small passenger vehicles, motor truck cabs, and the like.

Objects of the invention are to provide a ventilating structure by which the passenger compartment of a vehicle may be positively and completely ventilated under all weather conditions; to provide a ventilator structure by which fresh air may be injected into the passenger compartment of a vehicle and vitiated air exhausted therefrom which is universal in the sense that it may be readily adapted for mounting on a roof structure of any curvature; to provide a vehicle ventilating structure having air flow control means associated therewith whereby the incoming air may be directed toward the windshield or toward the driver, and in either operation, the volume of air or complete circulation is not retarded; and to provide a vehicle ventilating structure which is especially economical to manufacture and install and is efficient in use under all weather conditions.

Other objects of the invention will become apparent from the following specification, the drawing relating thereto and from the claims hereinafter set forth.

In the drawing in which like numerals are used to designate like parts in the several views throughout;

Figure 1 is a side elevational view of a vehicle having associated therewith a ventilator embodying features of the present invention;

Fig. 2 is a partial longitudinal cross sectional view taken through the ventilator and vehicle roof of the structure shown in Fig. 1;

Fig. 3 is a front elevational view of the ventilating shell, or hood, shown in Fig. 2;

Fig. 4 is a bottom plan view of the air inlet and outlet control means, in closed position, shown in Fig. 2.

The present invention relates in certain respects to improvements over the structure shown in the co-pending application of William Lintern et al., Serial No. 1916 filed January 15, 1935, now Patent No. 2,073,159, patented March 9, 1937, in which a structure is provided for ejecting air from the interior of a vehicle.

The present invention provides a structure which may conveniently be applied to a conventional vehicle roof structure for supplying fresh air into the passenger compartment of the vehicle and ejecting the vitiated air therefrom. According to the present invention, a single opening is provided in the roof communicating with the passenger compartment in a position adjacent the front wall of the vehicle. A streamlined shell, or hood, is mounted on the roof of the vehicle over the opening and has a front wall which extends forwardly or projects beyond the front wall of the vehicle above the windshield thereby providing an air inlet opening. Exhaust openings are provided in the top of the shell; and means are provided for separating the interior of the shell into a plurality of chambers, one of the chambers being in communication with the inlet opening and the other chamber being in communication with the exhaust openings. Both of these chambers communicate through the opening in the vehicle roof with the interior of the passenger vehicle, and means are provided on the interior of the vehicle for controlling the amount of air flowing through the opening in the roof.

The lower edges of the side of the shell are curved complementary in shape to the curvature of the vehicle roof; and as the shell is preferably made out of a thin sheet metal, the lower edges of the sides may be very easily cut to a shape corresponding to the curvature of the roof so that the shell snugly fits against the roof of a vehicle having any curvature.

For a better understanding of the invention reference may be had to the drawing in which in Fig. 1 a truck 10 is illustrated having a passenger cab 12. Although the present invention is particularly adapted for truck cabs because the passenger compartment of such cabs is relatively small and the air therein generally is contaminated with fumes from the engine, it is to be understood that the present invention is of general utility and may be used on other types of vehicles such as taxi cabs, pleasure vehicles, and the like.

The truck cab 12 comprises a front wall 14 including a windshield and a roof member 16 which in conventional constructions is curved downwardly adjacent the front thereof, merging with the upper portion of the front wall 14. A transversely extending opening 18 preferably located substantially centrally of the cab is provided through the roof member 16 near to or adjacent the front wall 14. The opening 18 communicates with the interior of the passenger vehicle and with a ventilating shell 20 in a manner to be described in detail.

The ventilating shell member 20 having a front wall 22, a top wall 24 and side walls 26 is mounted on the roof member 16 substantially centrally of the cab with the rear portion thereof lying over the opening 18. The front wall 22 extends forwardly of or projects beyond the front wall 14 of the truck cab 12 to provide an air inlet opening 28.

The front wall 22 slopes upwardly and rearwardly merging with the back wall 24 which extends rearwardly and gradually slopes downwardly providing a streamlined effect so that any eddy currents and back drags, which would normally be occasioned by the impingement of such high velocity air streams, is reduced to a minimum. Transversely extending openings 30 are provided through the top wall 24 adjacent its juncture with the front wall 22 providing exhaust openings in the shell. Louvres 32 are preferably provided on the outside of the shell adjacent the edges of the openings 30. In the structure illustrated two such openings are shown, but it is to be understood that the number of openings may be varied, if desired, within the scope of the present invention.

A transversely extending member 34 engages the side wall 26 adjacent its side edges, engages the back wall 24 forwardly of the openings 30 along its forward edge, and engages the back wall 24 adjacent the rear thereof along its rear edge. The member 34 thus divides the interior of the shell 20 into two separate chambers 36 and 38. The chambers 36 and 38 communicate with the inlet opening 28 and exhaust opening 30, respectively. The separating member 34 has a transversely extending opening 40 therethrough adjacent the rear thereof and located above and in line with the rear portion of the opening 18 for thus communicating the exhaust chamber 38 with the interior of the vehicle through the opening 18.

A transversely extending member 42 is mounted above the roof member 16 within the shell 20 substantially centrally of the opening 18 to maintain separate the stream of air entering the vehicle body from the stream of air being exhausted therefrom. Another transversely extending member 44 is provided in a position similar to that for 42 adjacent the rear edge of the opening 18 to provide a confining channel for the air being exhausted from the passenger compartment.

A transversely extending baffle member 46 is suitably secured to the roof member 16 adjacent the rear of the inlet opening 28 and extends upwardly into the inlet chamber 36 so that any water, or the like, carried into the inlet chamber will strike against the baffle member and be prevented from gaining access to the interior of the passenger compartment. A screen member 48 is also preferably suitably mounted within the inlet opening 28 to prevent the entrance of foreign material into the inlet chamber 36.

A transversely extending splash screen 50 is mounted on the separating member 34 within the exhaust chamber 38 preferably directly beneath the exhaust opening 30 so that rain or other foreign material entering the exhaust chamber 38 will strike against the screen and be prevented from entering the passenger compartment. As illustrated in Fig. 2, the separating member 34 preferably slopes forwardly and downwardly so that any moisture collected therein will drain towards the front of the shell; and suitable openings may be provided in the sides of the shell to drain the collected water therefrom.

In order to control the volume and direction of the air entering the compartment and being exhausted therefrom, an air flow control means 52 is preferably mounted within the passenger compartment in surrounding relation to the opening 18. The control means comprises a frame member 54 preferably made of metal having an opening 56 therethrough in alignment with the opening 18 through the roof member. Upstanding members 58 are mounted within the frame 54; and a transversely extending member 60 is secured at its end to the frame member 54 substantially at the longitudinal center of the opening 56. Shutter members 62 and 64 are hingedly mounted to a common hinge rod 66 which is suitably secured to the member 60.

The shutter 62 is so mounted that it may be adjustably positioned to control the flow or air through the forward part of the opening 56 which is in communication with the inlet chamber 36; and the shutter 64 is arranged for controlling the flow of air through the rear portion of the opening 56 which communicates with the exhaust chamber 38. The hinge connection for the shutters 62 and 64 may be of the so-called piano hinge type, and the hinges are preferably so constructed to frictionally resist movement of the shutters 62 and 64 about their axes so that the shutters may be moved to an adjusted position and remain in that position. Suitable means such as finger engaging clips 70 may be provided for each of the shutters 62 and 64 so that they may be conveniently operated by passengers of the vehicle.

An insulating sheet member 72 is preferably provided on the under surface of the roof member 16 between the air flow control member 52 and the roof member and is provided with an opening therethrough in alignment with and corresponding to the opening 18 in the roof member 16.

In operation, as the fresh air sweeps upwardly over the windshield 14, a portion of it is trapped by the forwardly extending lower edge of the front wall 22 and caused to pass through the inlet opening 28 into the inlet chamber 36 and then into the passenger compartment through the forward portions of the openings 18 and 56. By suitably controlling the position of the shutter 62, the direction and volume of the air entering the passenger compartment may be effectively controlled. Thus the air entering the passenger compartment may be shut off completely, or it may be directed forwardly against the rear face of the windshield or rearwardly against the passengers of the vehicle. When the air is directed forwardly against the rear face of the windshield, an adequate circulation of fresh air is provided for the passengers of the vehicle and further, the formation of moisture on the rear of the windshield is prevented, particularly in cold weather operation.

The air sweeping upwardly over the front of the vehicle and over the front wall 22 of the shell creates a low pressure area immediately above the opening 30 and thus causes the air to be exhausted from the interior of the vehicle through the rear portions of the openings 54 and 18 and through the exhaust chamber 38.

Formal changes may be made in the specific embodiment of the invention described without departing from the spirit and substance of the broad invention the scope of which is commensurate with the appended claims.

What is claimed is:

1. A vehicle body and ventilator comprising a roof structure and a front wall adjacent thereto, a downwardly directed opening in the roof adjacent said wall and communicating with the interior of the body, a shell member mounted on said roof over said opening, said shell member having a forwardly facing wall extending forwardly of said first named wall to provide an air inlet opening, means forming an air exhaust opening in the top of said shell closely adjacent said forwardly facing wall, means dividing the interior of said shell into separate chambers, one of said chambers being in communication with said inlet opening and another of said chambers being in communication with said exhaust opening, and means providing independent communication for each of said chambers with the interior of said body through said first named opening.

2. A vehicle body and ventilator comprising a roof structure and a front wall adjacent thereto, a downwardly directed opening in the roof adjacent said wall and communicating with the interior of the body, a stream line shell including top, side and front walls mounted transversely of said roof over said opening, said front wall of said shell member extending forwardly of said first named wall to provide an air inlet opening, means forming an air exhaust opening in the top of said shell closely adjacent the front wall of said shell, means dividing the interior of said shell into separate chambers, one of said chambers being in communication with said inlet opening and the other of said chambers being in communication with said exhaust opening, and means providing independent communication for each of said chambers with the interior of said body through said first named opening.

3. A vehicle body and ventilator comprising a roof structure and a front wall adjacent thereto, a downwardly directed opening in the roof adjacent said wall and communicating with the interior of the body, a shell member mounted on said roof over said opening, said shell member having a forwardly facing wall extending forwardly of said first named wall to provide an air inlet opening, a transversely extending baffle member mounted adjacent the rear of said last named opening and extending upwardly into said shell, means forming an air exhaust opening in the top of said shell closely adjacent said forwardly facing wall, means dividing the interior of said shell into separate chambers, one of said chambers being in communication with said inlet opening and another of said chambers being in communication with said exhaust opening, and means providing independent communication for each of said chambers with the interior of said body through said first named opening.

4. A vehicle body and ventilator comprising a roof structure and a front wall adjacent thereto, a downwardly directed opening in the roof adjacent said wall and communicating with the interior of said body, a shell member mounted on said roof over said opening, said shell member having a forwardly facing wall extending forwardly of said first named wall to provide an air inlet opening, means forming an air exhaust opening in the top of said shell closely adjacent said forwardly facing wall, means dividing the interior of said shell into separate chambers, one of said chambers being in communication with said inlet opening and another of said chambers being in communication with said exhaust opening, an air flow control means mounted interiorly of said body over said first named opening, said last named means including shutter members providing independent communication for each of said chambers with the interior of said body through said first named opening.

5. A vehicle body and ventilator comprising a roof structure and a front wall adjacent thereto, a downwardly directed opening in the roof adjacent said wall and communicating with the interior of said body, a shell member on said roof over said opening, said shell member having a forwardly facing wall extending forwardly of said first named wall to provide an air inlet opening, means forming an air exhaust opening in the top of said shell closely adjacent said forwardly facing wall, means dividing the interior of said shell into separate chambers, one of said chambers being in communication with said inlet opening and another of said chambers being in communication with said exhaust opening, an air flow control means mounted interiorly of said body over said first named opening, said last named means including shutter members providing independent communication for each of said chambers with the interior of said body through said first named opening, the shutter member controlling the flow of air from the chamber communicating with the inlet opening being so constructed and arranged as to adjustably direct the flow of air forwardly within the passenger compartment.

6. A vehicle body and ventilator comprising a front wall and a roof structure having a curved surface adjacent the front thereof merging with said front wall, a downwardly directing opening in the roof adjacent said wall and communicating with the interior of said body, a shell member including top, side and front walls mounted transversely of said roof over said opening, said front wall of said shell member extending forwardly of said first named wall to provide an air inlet opening, the lower edges of said side walls of said shell member being curved complementary in shape to the curvature of the roof structure, means forming an air exhaust opening in the top of said shell closely adjacent the front wall of said shell member, means dividing the interior of said shell into separate chambers, one of said chambers being in communication with said inlet opening and another of said chambers being in communication with said exhaust opening, and means providing independent communication for each of said chambers with the interior of said body through said first named opening.

7. A vehicle body and ventilator comprising a roof structure and a front wall adjacent thereto, a downwardly directed opening in the roof adjacent said wall and communicating with the interior of the body, a shell member mounted on said roof over said opening, said shell member having a forwardly facing wall extending forwardly of said first named wall to provide an air inlet opening, means forming an air exhaust opening in the top of said shell closely adjacent said forwardly facing wall, means dividing the interior of said shell into separate chambers, one of said chambers being in communication with said inlet opening and another of said chambers being in communication with said exhaust opening and air flow control means mounted interiorly of said body over said first named opening, said last named means including transversely extending shutter members pivotally mounted about a common axis substantially centrally of said first named opening providing independent communication for each of said chambers with the interior of said body through said first named opening.

ALFRED R. LINTERN.
RICHARD C. SPOONER.